United States Patent
Melcher et al.

(10) Patent No.: US 11,361,360 B2
(45) Date of Patent: Jun. 14, 2022

(54) SUPPLEMENTING AN IMAGE GALLERY WITH STATUS INDICATORS

(71) Applicant: eBay Inc., San Jose, CA (US)

(72) Inventors: Ryan Melcher, Ben Lomond, CA (US); Dane Howard, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/797,719

(22) Filed: Feb. 21, 2020

(65) Prior Publication Data

US 2020/0211081 A1 Jul. 2, 2020

Related U.S. Application Data

(63) Continuation of application No. 16/215,308, filed on Dec. 10, 2018, now Pat. No. 10,607,272, which is a continuation of application No. 15/210,415, filed on Jul. 14, 2016, now Pat. No. 10,169,801, which is a continuation of application No. 12/559,395, filed on Sep. 14, 2009, now Pat. No. 9,406,042.

(60) Provisional application No. 61/155,095, filed on Feb. 24, 2009.

(51) Int. Cl.
*G06Q 30/06* (2012.01)
*G06Q 10/10* (2012.01)
*G06Q 30/08* (2012.01)
*G06Q 30/02* (2012.01)
*H04L 67/75* (2022.01)

(52) U.S. Cl.
CPC ......... *G06Q 30/0627* (2013.01); *G06Q 10/10* (2013.01); *G06Q 30/06* (2013.01); *G06Q 30/0603* (2013.01); *G06Q 30/0631* (2013.01); *G06Q 30/08* (2013.01); *G06Q 30/0275* (2013.01); *H04L 67/36* (2013.01)

(58) Field of Classification Search
None
See application file for complete search history.

(56) References Cited

U.S. PATENT DOCUMENTS

| 5,579,472 A | 11/1996 | Keywort et al. |
| 7,912,852 B1* | 3/2011 | McElroy ............... G06F 16/951 707/769 |
| 9,406,042 B2 | 8/2016 | Melcher et al. |

(Continued)

OTHER PUBLICATIONS

Applicant Initiated Interview Summary received for U.S. Appl. No. 16/215,308, dated Jul. 25, 2019, 3 pages.

(Continued)

*Primary Examiner* — Rinna Yi
(74) *Attorney, Agent, or Firm* — FIG. 1 Patents

(57) ABSTRACT

In various example embodiments, a system and method to provide status indictors on an image galley is disclosed. At least one item to be displayed in an image gallery on a client device is identified. Once identified, status information for the item is obtained. Subsequently, gallery rendering and display instructions are generated and transmitted to the client device. The rendering and display instructions include the status information and enables generation of status indicators from the status information for display over the image gallery at the client device. The rendering and display instructions may also include instructions for displaying the image gallery. The status information at the client device may be updated as status information changes.

20 Claims, 9 Drawing Sheets

(56) References Cited

U.S. PATENT DOCUMENTS

| | | | |
|---|---|---|---|
| 10,169,801 | B2 | 1/2019 | Melcher et al. |
| 10,607,272 | B2 | 3/2020 | Melcher et al. |
| 2001/0029465 | A1 | 10/2001 | Strisower |
| 2002/0133446 | A1 | 9/2002 | Lee |
| 2003/0220867 | A1 | 11/2003 | Goodwin et al. |
| 2003/0236752 | A1 | 12/2003 | Dawson et al. |
| 2005/0004990 | A1 | 1/2005 | Durazo et al. |
| 2005/0131799 | A1 | 6/2005 | Clay et al. |
| 2006/0069623 | A1 | 3/2006 | Macdonald korth et al. |
| 2006/0101131 | A1 | 5/2006 | Hess et al. |
| 2007/0022020 | A1 | 1/2007 | Bernstein |
| 2007/0219712 | A1 | 9/2007 | Abhyanker |
| 2007/0233854 | A1 | 10/2007 | Bukovec et al. |
| 2007/0244769 | A1* | 10/2007 | Boesel ............... G06Q 30/0601 705/26.1 |
| 2008/0077597 | A1 | 3/2008 | Butler |
| 2008/0154898 | A1 | 6/2008 | Cheng et al. |
| 2008/0184157 | A1 | 7/2008 | Selig |
| 2008/0255962 | A1 | 10/2008 | Chang et al. |
| 2009/0018942 | A1 | 1/2009 | Hamman et al. |
| 2009/0094260 | A1 | 4/2009 | Cheng et al. |
| 2009/0176482 | A1 | 7/2009 | Martin et al. |
| 2009/0182622 | A1 | 7/2009 | Agarwal et al. |
| 2009/0235187 | A1 | 9/2009 | Kim et al. |
| 2009/0292769 | A1 | 11/2009 | Matsuzawa |
| 2009/0307219 | A1 | 12/2009 | Bennett |
| 2010/0214302 | A1 | 8/2010 | Melcher et al. |
| 2016/0321731 | A1 | 11/2016 | Melcher et al. |
| 2019/0108570 | A1 | 4/2019 | Melcher et al. |

OTHER PUBLICATIONS

Non-Final Office Action received for U.S. Appl. No. 16/215,308, dated Jun. 21, 2019, 15 pages.
Notice of Allowance received for U.S. Appl. No. 16/215,308, dated Nov. 21, 2019, 9 pages.
Response to Non-Final Office Action filed on Aug. 30, 2019, for U.S. Appl. No. 16/215,308, dated Jun. 21, 2019, 14 Pages.
"Screenshoots-Swoopo Review", Retrieved from the Internet URL:<https://ww.youtube.com/watch?v=TdttRVrWOvw>, Jan. 15, 2009, 1 Page.
Final Office Action received for U.S. Appl. No. 12/559,395, dated Aug. 29, 2012, 18 Pages.
Final Office Action received for U.S. Appl. No. 12/559,395, dated May 14, 2014, 19 Pages.
Final Office Action received for U.S. Appl. No. 12/559,395, dated Nov. 30, 2011, 12 Pages.
Non-Final Office Action received for U.S. Appl. No. 12/559,395, dated Apr. 30, 2012, 15 Pages.
Non-Final Office Action received for U.S. Appl. No. 12/559,395, dated Aug. 5, 2011, 13 Pages.
Non-Final Office Action received for U.S. Appl. No. 12/559,395, dated Dec. 26, 2014, 27 pages.
Non-Final Office Action received for U.S. Appl. No. 12/559,395, dated Nov. 8, 2013, 21 Pages.
Non-Final Office Action received for U.S. Appl. No. 12/559,395, dated Sep. 14, 2015, 30 Pages.
Notice of Allowance received for U.S. Appl. No. 12/559,395, dated Mar. 31, 2016, 17 pages.
Response to Final Office Action filed on Feb. 29, 2012, for U.S. Appl. No. 12/559,395, dated Nov. 30, 2011, 11 Pages.
Response to Final Office Action filed on Nov. 28, 2012, for U.S. Appl. No. 12/559,395, dated Aug. 29, 2012, 12 Pages.
Response to Final Office Action filed on Sep. 15, 2014, for U.S. Appl. No. 12/559,395, dated May 14, 2014, 14 Pages.
Response to Non-Final Office Action filed on Apr. 20, 2015, for U.S. Appl. No. 12/559,395, dated Dec. 26, 2014, 17 Pages.
Response to Non-Final Office Action filed on Dec. 14, 2015, for U.S. Appl. No. 12/559,395, dated Sep. 14, 2015, 15 pages.
Response to Non-Final Office Action filed on Feb. 10, 2014, for U.S. Appl. No. 12/559,395, dated Nov. 8, 2013, 13 Pages.
Response to Non-Final Office Action filed on Jul. 30, 2012, for U.S. Appl. No. 12/559,395, dated Apr. 30, 2012, 12 Pages.
Response to Non-Final Office Action filed on Nov. 7, 2011, for U.S. Appl. No. 12/559,395, dated Aug. 5, 2011, 12 Pages.
Applicant Initiated Interview Summary received for U.S. Appl. No. 15/210,415, dated Jan. 24, 2018, 3 pages.
Applicant Initiated Interview Summary received for U.S. Appl. No. 15/210,415, dated Jul. 5, 2018, 3 pages.
Final Office Action received for U.S. Appl. No. 15/210,415, dated May 29, 2018, 17 pages.
Non-Final Office Action received for U.S. Appl. No. 15/210,415, dated Dec. 22, 2017, 11 Pages.
Notice of Allowability received for U.S. Appl. No. 15/210,415, dated Sep. 7, 2018, 7 pages.
Notice of Allowance received for U.S. Appl. No. 15/210,415, dated Aug. 27, 2018, 12 pages.
Response to Final Office Action filed on Jul. 9, 2018, for U.S. Appl. No. 15/210,415, dated May 29, 2018, 24 pages.
Response to Non-Final Office Action filed on Jan. 26, 2018, for U.S. Appl. No. 15/210,415, dated Dec. 22, 2017, 13 pages.
Supplemental Amendment Response to Final Office Action filed on Aug. 21, 2018, for U.S. Appl. No. 15/210,415, dated May 29, 2018, 14 pages.
Taylor, "How do I avoid snipers on my eBay auctions?", Retrieved from the Internet URL:<https://www.askdavetaylor.com/avoid_snipers_on_ebay_auctions/>, Sep. 2, 2006, 17 Pages.

* cited by examiner

SUPPLEMENTING AN IMAGE GALLERY WITH STATUS INDICATORS

RELATED APPLICATIONS

This application is a continuation of and claims priority to U.S. patent application Ser. No. 16/215,308, filed Dec. 10, 2018, which claims priority under 35 U.S.C. § 120 to U.S. Pat. No. 10,169,801, filed on Jul. 14, 2016, which claims priority under 35 U.S.C. § 120 to U.S. Pat. No. 9,406,042, filed on Sep. 14, 2009, which claims priority to U.S. Provisional Application Ser. No. 61/155,095, filed on Feb. 24, 2009, the disclosures of which are incorporated in their entireties.

FIELD

The present disclosure relates generally to information retrieval, and in a specific example embodiment, to supplementing an image gallery with status indicators.

BACKGROUND

Websites provide a number of publishing, listing, and price-setting mechanisms whereby a seller may list or publish information concerning items for sale. A buyer, as well as the seller, typically is interested in monitoring items of interest. For example, the seller may want to track the status of the items that seller is attempting to sell. In contrast, the buyer may desire to search for, or track, items the buyer is interested in acquiring or, in the case of an auction, items on which the buyer has placed a bid.

Conventionally, the buyer or seller accesses a list of items. In some cases, the list comprises items the buyer has purchased, is currently bidding on, has searched for previously, or is watching for possible future purchase. For sellers, the list may comprise items that the seller has offered for sale and current prices. These lists are generally displayed in a scroll through embodiment (e.g., on a webpage whereby the user may scroll down the page to view the various listings) whereby the user needs to select (e.g., click-through) a particular item from the list in order to view more detailed information regarding the status of the item. For small, mobile devices, such lists are often difficult to view and navigate.

BRIEF DESCRIPTION OF DRAWINGS

Various ones of the appended drawings merely illustrate example embodiments, and are not intended to be limiting.

DETAILED DESCRIPTION

The description that follows includes systems, methods, techniques, instruction sequences, and computing machine program products that embody illustrative embodiments. In the following description, for purposes of explanation, numerous specific details are set forth in order to provide an understanding of various embodiments. It will be evident, however, to those skilled in the art that embodiments may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the status indicator display system and method described herein and is considered as being within a scope of example embodiments. Each of a variety of example embodiments is discussed in detail, below.

Example embodiments described herein provide systems and methods to provide status indictors on an image galley. At least one item to be displayed in an image gallery on a client device is identified. Once identified, status information for the at least one item is obtain. In example embodiments, the status information may be obtained from the image catalog, from a database of currently available items, or any other source of information. Subsequently, gallery rendering and display instructions are generated and transmitted to the client device. The rendering and display instructions include the status information and enables generation of status indicators from the status information for display over the image gallery at the client device. The rendering and display instructions may also include instructions for displaying the image gallery.

The status information at the client device may be updated. In some embodiments, status information is determined and transmitted at a predetermined time or based on a triggering event. In other embodiments, a status update request may be received from the client device.

Figure 1:
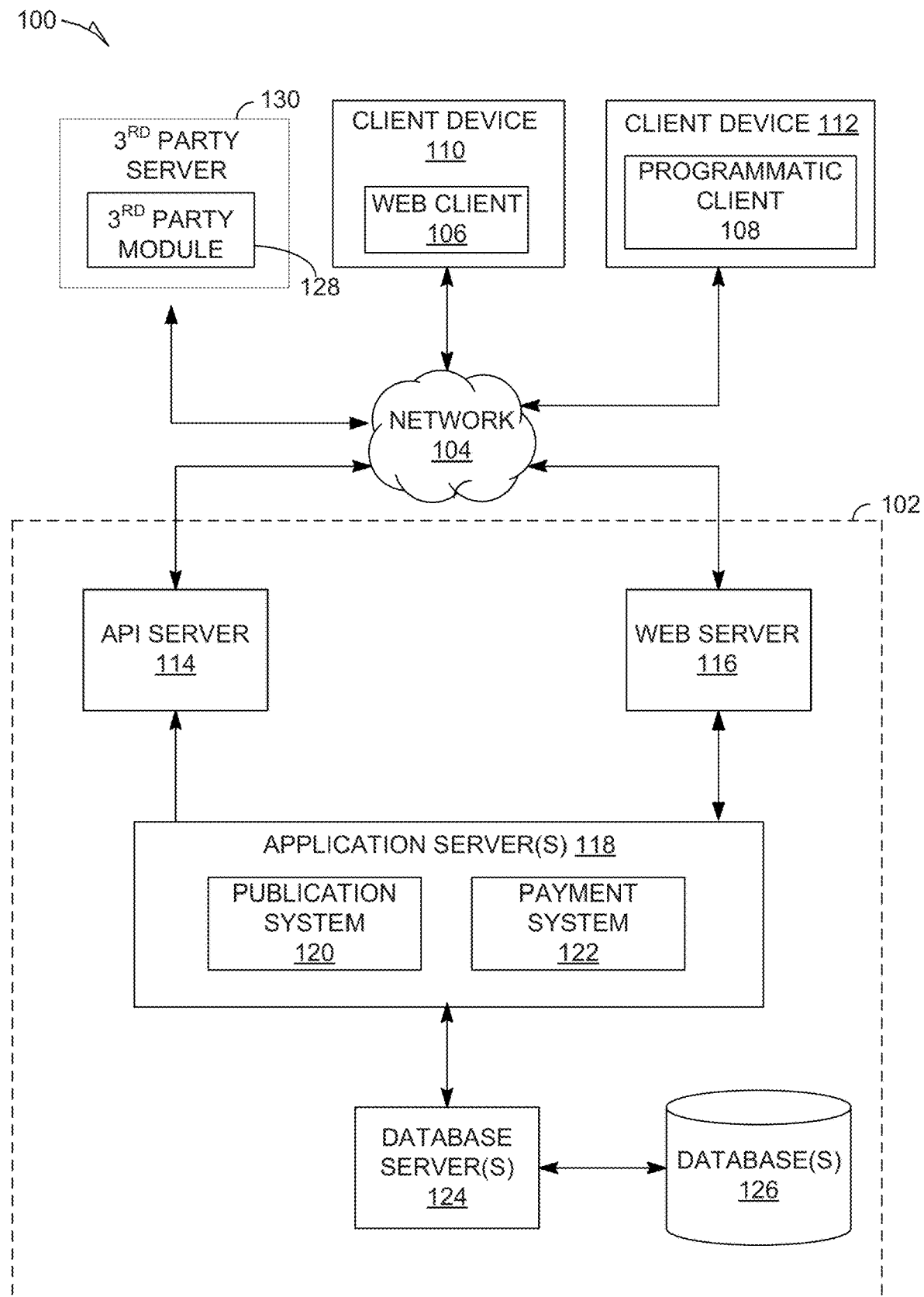
FIG. 1 is a block diagram illustrating an example embodiment of a network architecture of a system used to identify items depicted in images.

With reference to FIG. 1, an example embodiment of a high-level client-server-based network architecture 100 for providing targeted merchandising to returning user is shown. A networked system 102, in an example form of a network-server-side functionality, is coupled via a network 104 (e.g., the Internet or Wide Area Network (WAN)) to one or more clients. FIG. 1 illustrates, for example, a web client 106 operating via a browser (e.g., such as the Internet Explorer® browser developed by Microsoft® Corporation of Redmond, Wash. State), and a programmatic client 108 executing on respective client devices 110 and 112. The client devices 110 and 112 may comprise a mobile phone, desktop computer, laptop, or any other communication device that a user may utilize to access the networked system 102.

An Application Program Interface (API) server 114 and a web server 116 are coupled to, and provide programmatic and web interfaces respectively to, one or more application servers 118. The application servers 118 host a publication system 120 and a payment system 122, which may comprise one or more modules, applications, or engines, each of which may be embodied as hardware, software, firmware, or any combination thereof. The application servers 118 are, in turn, coupled to one or more database servers 124 facilitating access to one or more information storage repositories or database(s) 126.

The storage databases 126 may store information regarding items presented on the networked system 102. For example, the items may comprise items for sale or auction via the publication system 120. The information stored may include images, current prices, start and end time for an auction, seller's information, or any other information relevant to the item.

The publication system 120 provides a number of publication and marketplace functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (i.e., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party website may, for example, provide one or more promotional, marketplace, or payment functions that are supported by the relevant applications of the networked system 102.

In some embodiments, the client device (e.g., client device 110) captures and transmits an image of an item of interest to the networked system 102. The image may be captured by a camera built into the client device 110 or by a digital camera, which is configurable to download its stored images to the client device 110. In some cases, the image may be a representation of the item of interest (e.g., barcode for the item). Alternatively, the user may locate the image through, for example, the Internet or other image repositories (e.g., using the browser). Additionally, the client device 110 may capture a verbal description of the item of interest. Images (both captured and obtained from other sources) and verbal descriptions are herein collectively referred to as image data.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
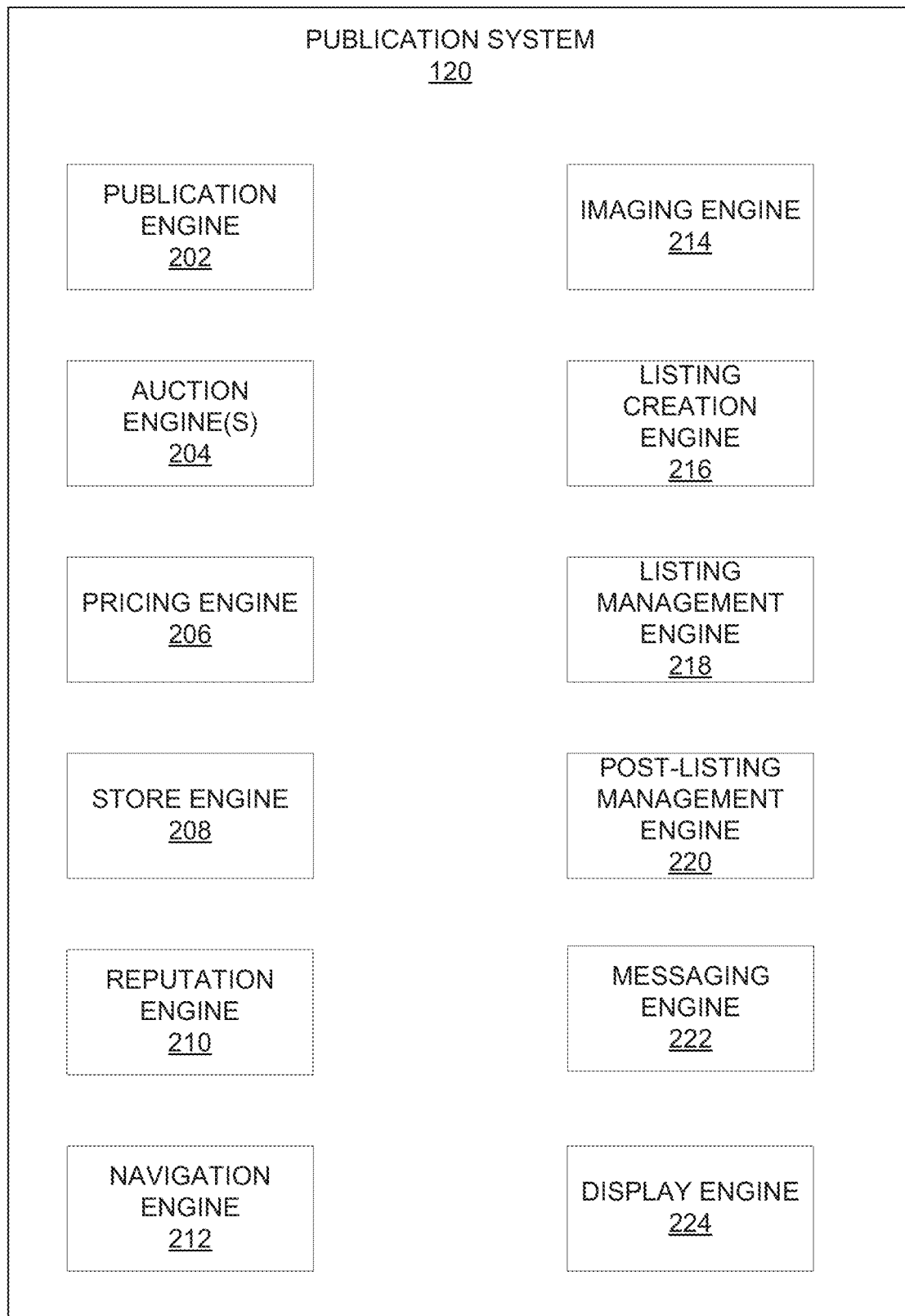
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

The networked system 102 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed-price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the networked system 102 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the networked system 102 over time. Other potential trading partners may then reference the reputation for purposes of assessing credibility and trustworthiness.

Navigation of the network-based publication system may be facilitated by a navigation engine 212. For example, a search module (not shown) of the navigation engine 212 enables keyword searches of listings published via the publication system 120. In a further example, a browse module (not shown) of the navigation engine 212 allows users to browse various category, catalogue, or inventory data structures according to which listings may be classified within the publication system 120. Various other navigation applications within the navigation engine 212 may be provided to supplement the searching and browsing applications.

In order to make listings available via the networked system 102 as visually informing and attractive as possible, the publication system 120 may include an imaging engine 214 that enables users to upload images for inclusion within listings and to incorporate images within viewed listings. The imaging engine 214 also receives image data from a user and utilizes the image data to identify an item depicted or described by the image data. The imaging engine 214 will be discussed in more detail in connection with FIG. 3, below.

A listing creation engine 216 allows sellers to conveniently author listings pertaining to goods or services that sellers wish to transact via the networked system 102, while a listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

A display engine 224 manages data associated with image galleries. In example embodiments, the display engine 224 obtains and formats data for image galleries and transmits the formatted data to a requesting client device. The display engine 224 also manages status information for image galleries. The display engine 224 will be discussed in more detail in connection with FIG. 4.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
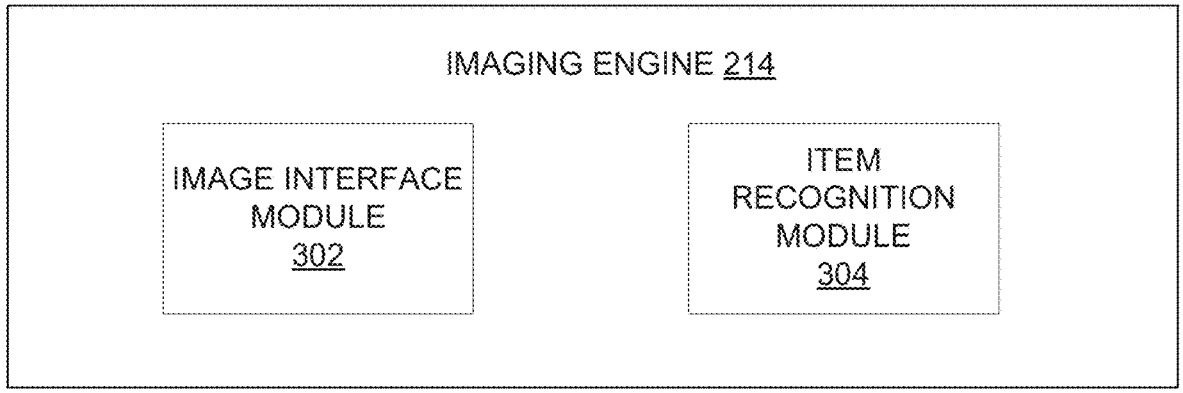
FIG. 3 is a block diagram illustrating an example embodiment of an imaging engine.

Application of Embodiments of the Status Indicator Platform into the Example Network Architecture Referring now to FIG. 3, an example diagram of the imaging engine 214 is shown. The imaging engine 214, in conjunction with the display engine 224, provides mechanisms for enabling a client device to display an image gallery comprising status indictors.

In example embodiments, the imaging engine 214 comprises an imaging interface module 302 and an item recognition module 304. Alternative embodiments may comprise further components or modules not directly related to example embodiments, and thus are not shown or discussed. Furthermore, some of the components of the imaging engine 214 may be located elsewhere (e.g., in the display engine 224) or be located at the client device.

The imaging interface module 302 provides a graphical user interface for user interaction with the various modules of the imaging engine 214 and display engine 224. In example embodiments, the graphical user interface allows the user to upload image data for use in searching for similar items as is discussed in more detail below.

The item recognition module 304 is configured to identify the item depicted by the image data. In one embodiment, components of the item recognition module 304 compare the image data to a catalog of items. The catalog may be organized as a matrix of data including a plurality of attributes associated with each item. For example, each item in the catalog may comprise an image, title, subtitle, category, sub-category, related item listings, average price, quantities of the item currently available, templates associated with the items, and any other data that may describe and distinguish the item from other items in the catalog. The catalog is a dynamic catalog. That is, as new items are listed or become known to the networked system 102, the new items will be added to the catalog. In one embodiment, the catalog may be stored in the database 126.

Thus, the uploaded image data may be compared against a collection of catalog image data within the catalog to determine one or more similar items. The collection of catalog image data may be user-provided or obtained from various public or commercial sources. The item recognition module 304 may use various recognition techniques, described in further detail below, to identify the item depicted by the uploaded image data.

Figure 4:
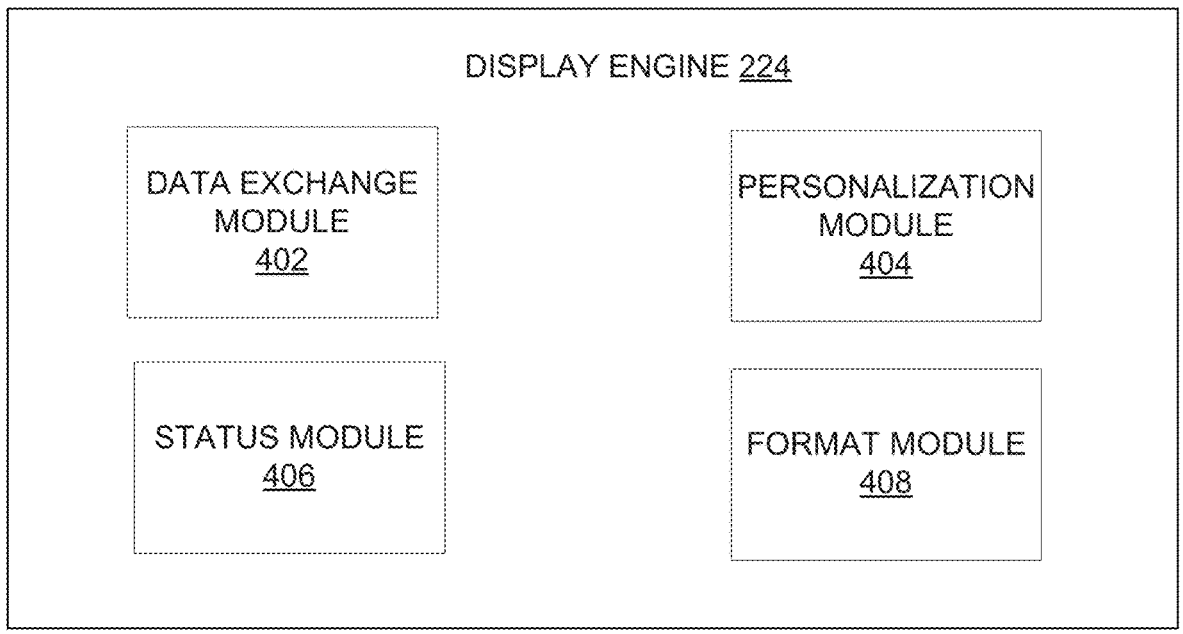
FIG. 4 is a block diagram illustrating an example embodiment of a display engine.

FIG. 4 illustrates an embodiment of the display engine 224. The display engine 224 comprises a data exchange module 402, a personalization module 404, a status module 406, and a format module 408. Alternative embodiments may comprise further components or modules not directly related to example embodiments of the image gallery status indicator system, and thus are not shown or discussed. Furthermore, some of the components of the display engine 224 may be located elsewhere (e.g., in the imaging engine 214), be located at the client device, or be combined into a single module.

The data exchange module 402 exchanges data with the client device. In example embodiments the data exchange module 402 receives and processes a gallery view indicator from the client device. The data exchange module 402 may also receive a status update request from the client device. In response, the data exchange module 402 provides the updated status information to the client device.

The personalization module 404 determines specific items of the image gallery for each user associated with the client device. In some embodiments, the personalization module 404 knows the identity of the user (e.g., the user logs in with the networked system 102). Using the identity, the personalization module 404 accesses the user's account and determines the items that are associated with the user's account. The items may be associated in various ways. For example, the user may have a list of one or more items the user is bidding on, watching, or selling.

Additionally, the user's account may indicate one or more favorite merchants or past purchased items. In one embodiment, the personalization module 404 may determine items associated with the one or more favorite merchants. In another embodiment, the personalization module 404 may determine items similar to previously purchased items (e.g., accessories or upgraded versions).

Furthermore, the personalization module 404 may obtain results of an item query sent by the user. In some embodiments, the item query is performed by the item recognition module 304. For example, image data is received from the user and the item recognition module 304 determines one or more similar items. These one or more similar items may then be returned to the personalization module 404. In other embodiments, an item query is performed by a search module (not shown) of the publication system 120 based on keywords. In yet other embodiments, the item query is performed by the navigation engine 212 whereby items are determined by navigating down categories of items or inventory data structures.

The status module 406 determines the status of the items associated with the user's image gallery. Once the items are determined by the personalization module 404, status information may be accessed by the status module 406. Status may include whether the item is recognized (e.g., in the client device's photo album or otherwise known to the user), being sold, sold, won, did not win, is most watched, is being watched, is locally in stock near the user, is popular, has a number of bids, requires feedback to be left, is from a favorite seller, or any other information that the user may find useful.

In some embodiments, the status module 406 may monitor items associated with a user for status updates. In some cases, an event may trigger an update to the status. For example, a higher bid on an auction item that the user had previously bid on may trigger an update such that the status indicator on the image gallery will now show that the user is no longer the highest bidder. In other cases, the status module 406 may update status at a predetermined time (e.g., every five hours). In one embodiment, preferences for status update monitoring for a user may be maintained by the status module 406, the personalization module 404, or another module/engine of the networked system 102.

The format module 408 formats the status information for transmission to the client device. In example embodiments, the format module generates rendering and display instructions including the status information. The rendering and display instructions enables generation of status indicators from the status information for display over the image gallery at the client device. The rendering and display instruction may also include instructions for rendering and displaying the image gallery.

In some embodiments, the rendering and display instructions converts, or provides instructions to convert, the status information into visually identifiable graphics that represent the status information. For example, a green check mark may indicate an item that is recognized by the client device; a dollar sign indicates an item the user is selling; a coupon graphic indicates the item is on sale, discounted, or is the deal of the day. A border around an image representing an item within the image gallery may also be displayed in different colors, which represent different status. For example, a blue border around the image may indicate that the item is one that belongs to the user (e.g., the user is selling); a red border around an image may indicate that the user did not win the auction; a yellow border around an image may indicate that the user is watching the item. It should be noted that any color border or visually identifiable graphic may be used to indicate any status associated with the item in the image.

Figure 5:
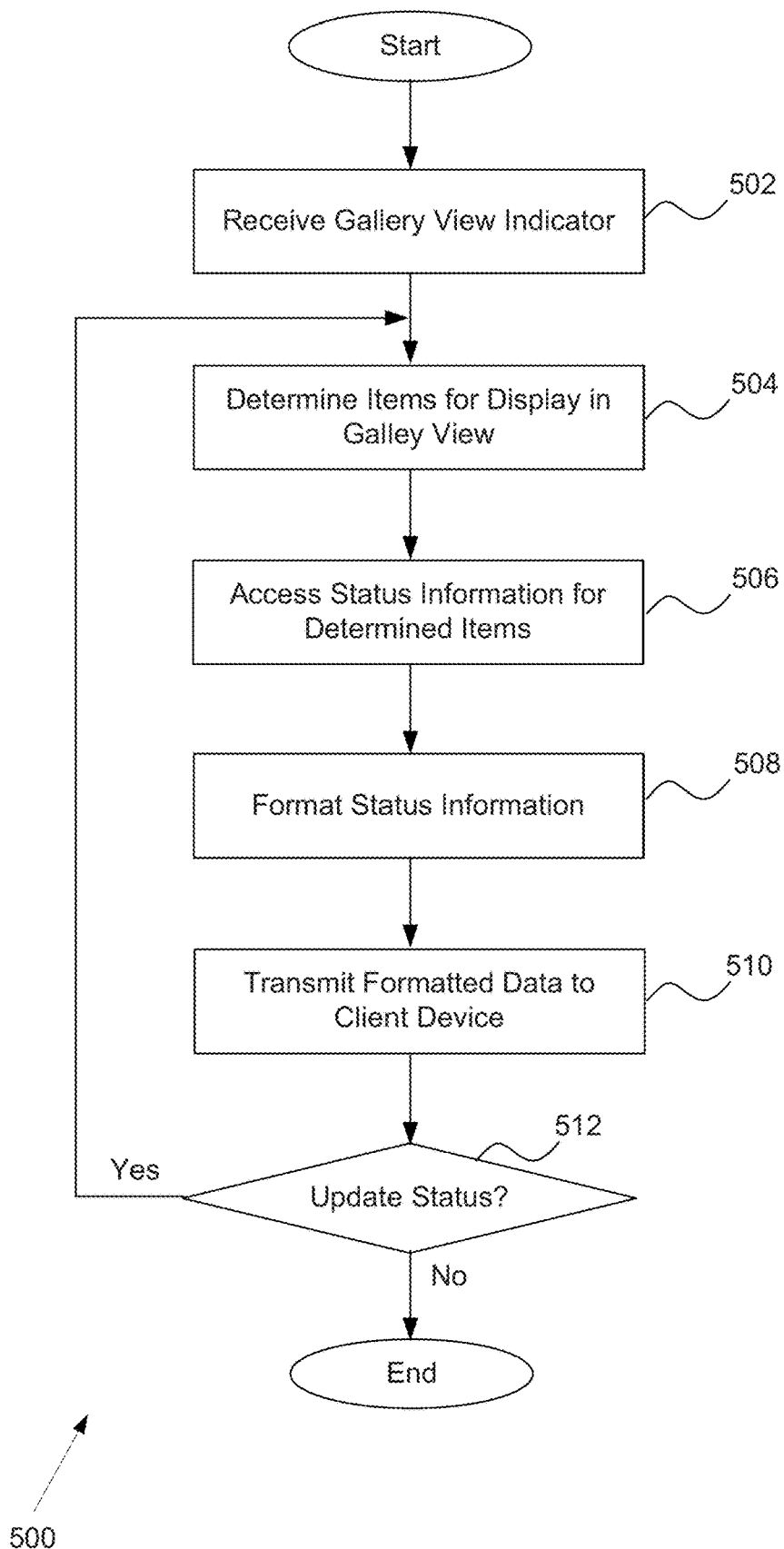
FIG. 5 is a flow diagram of an example method for providing status indicators on an image gallery.

Referring now to FIG. 5, a flow diagram of an example method 500 for providing status indicators on an image gallery is shown. The operations of the example method 500 occur at one or more application servers 118 hosting a publication system 120. At operation 502, a gallery view indicator is received from a client device. In example embodiments, the data exchange module 402 may receive the gallery view indicator. In one example, a user at the client device may have performed a search, and the results of the search may be displayed in a list view. The user may then indicate a desire to view the results in a galley view.

At operation 504, items for display in the gallery view are determined. In example embodiments, the personalization module 404 will determine the items. For example, a search may be performed for items. The returned items in the search result list are identified for display in the gallery view. In another example, the identity of the user is determined and the user's account is accessed. Items found in one or more lists associated with the user's account may be selected for display in the gallery view. In some embodiment, operation 502 and 504 may be combined or operation 504 may occur prior to operation 502 (e.g., search results determine the items and a gallery view indicator may then be received).

Status information for the determined items is accessed at operation 506. In some embodiments, the status information may be stored in an item catalog of the networked system 102. In other embodiments, status information may be obtained from a database of currently and recently available items offered on the networked system 102. For example, the status information may be obtained from all current item listings (e.g., stored in a database) of a network-based publication environment. In example embodiments, the status module 406 may obtain the status information from anywhere in the networked system 102 or from any database coupled to the networked system 102.

The status information is then formatted at operation 508. In example embodiments, the format module 408 formats the status information into gallery rendering and display instructions. The rendering and display instructions enables generation of status indicators from the status information for display over the image gallery at the client device. In some embodiments, the rendering and display instructions converts, or provides instructions to convert, the status information into visually identifiable graphics (e.g., status indicators) that represent the status information. The formatted data is then transmitted to the client device at operation 510.

Subsequently, a determination is made at operation 512 as to whether status should be updated at the client device. A status update may occur for several reasons. In one embodiment, a status update request may be received from the client device. In another embodiment, an event may trigger an update to the status (e.g., an item searched for and not initially found gets posted overnight). In a further embodiment, the status module 406 may update status at a predetermined time (e.g., every five hours).

Figure 6:
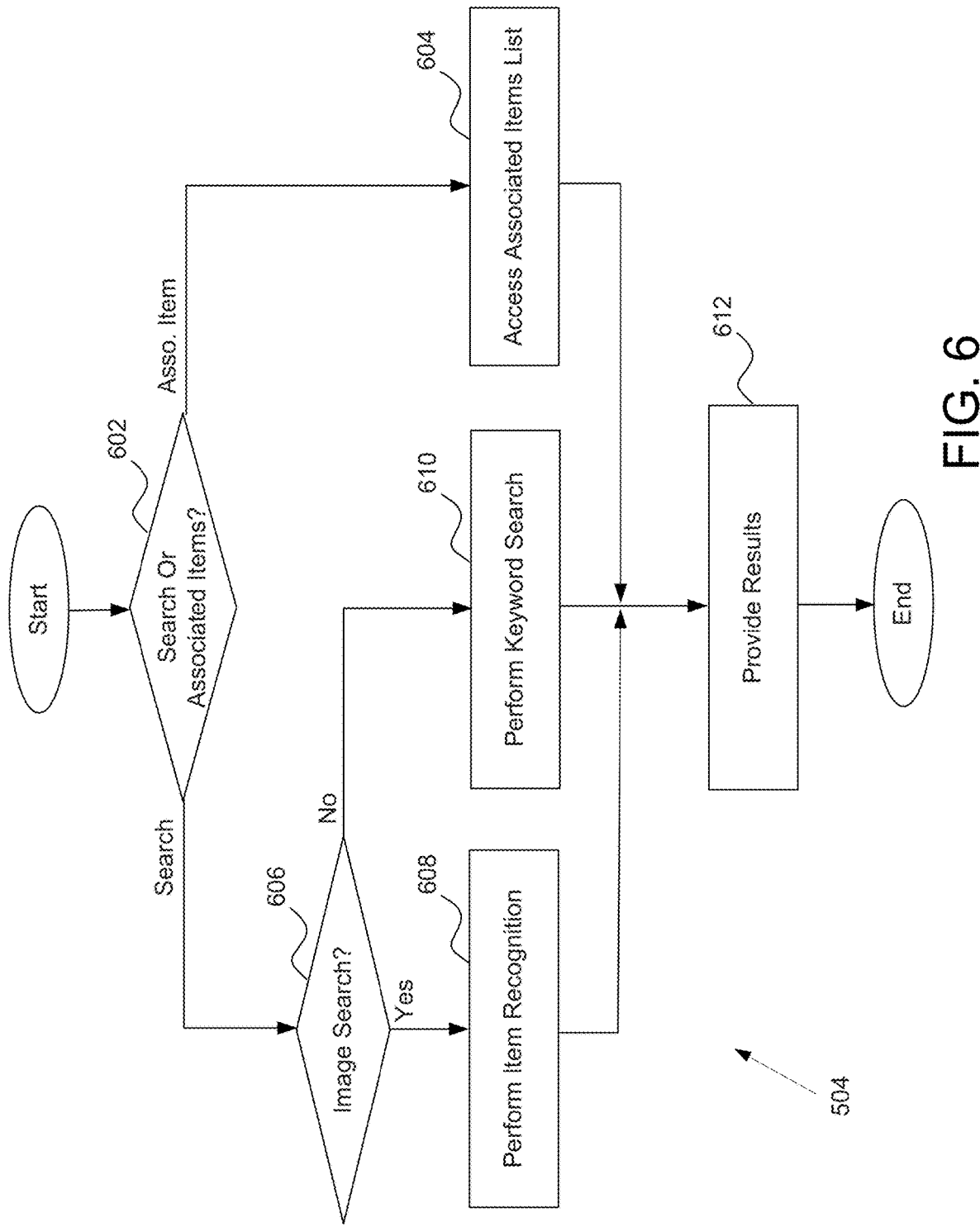
FIG. 6 is a flow diagram of an example method for determining items to display in the image gallery.

FIG. 6. is a flow diagram of an example method (e.g., operation 504) for determining one or more items to display in the image gallery. At operation 602, a determination is made as to whether the items are already associated with the user or whether the items are being searched for. If the items are already associated with the user, then one or more associated item lists are accessed at operation 604. In one embodiment, the identity of the user is determined and the user's account is accessed. Items found in one or more lists associated with the user's account may then be selected for display in the image gallery.

If the determination is based on a search, then a further determination is made at operation 606 as to whether the search is an image data search. If the search is an image data search, then at operation 608, an item recognition process is performed. In one embodiment, components of the item recognition module 304 compare the image data received from the user to a catalog of items. The catalog may be organized as a matrix of data including a plurality of attributes associated with each item. Thus, for example, the received image data may be compared against a collection of catalog image data within the catalog to determine one or more similar items.

If the search is a non-image search, then a keyword search is performed at operation 610. In example embodiments, a search query including one or more keywords is received from the user. A search module/engine (not shown) of the networked system 102 then searches for items including the one or more keywords. It should be noted that another non-image search query may be performed by the navigation engine 212 whereby items are determined by navigating down categories of items or inventory data structures.

The results of the search or the results from the associated items list are returned as results in operation 612. Subsequently, status information may be determined for the items.

Figure 7:
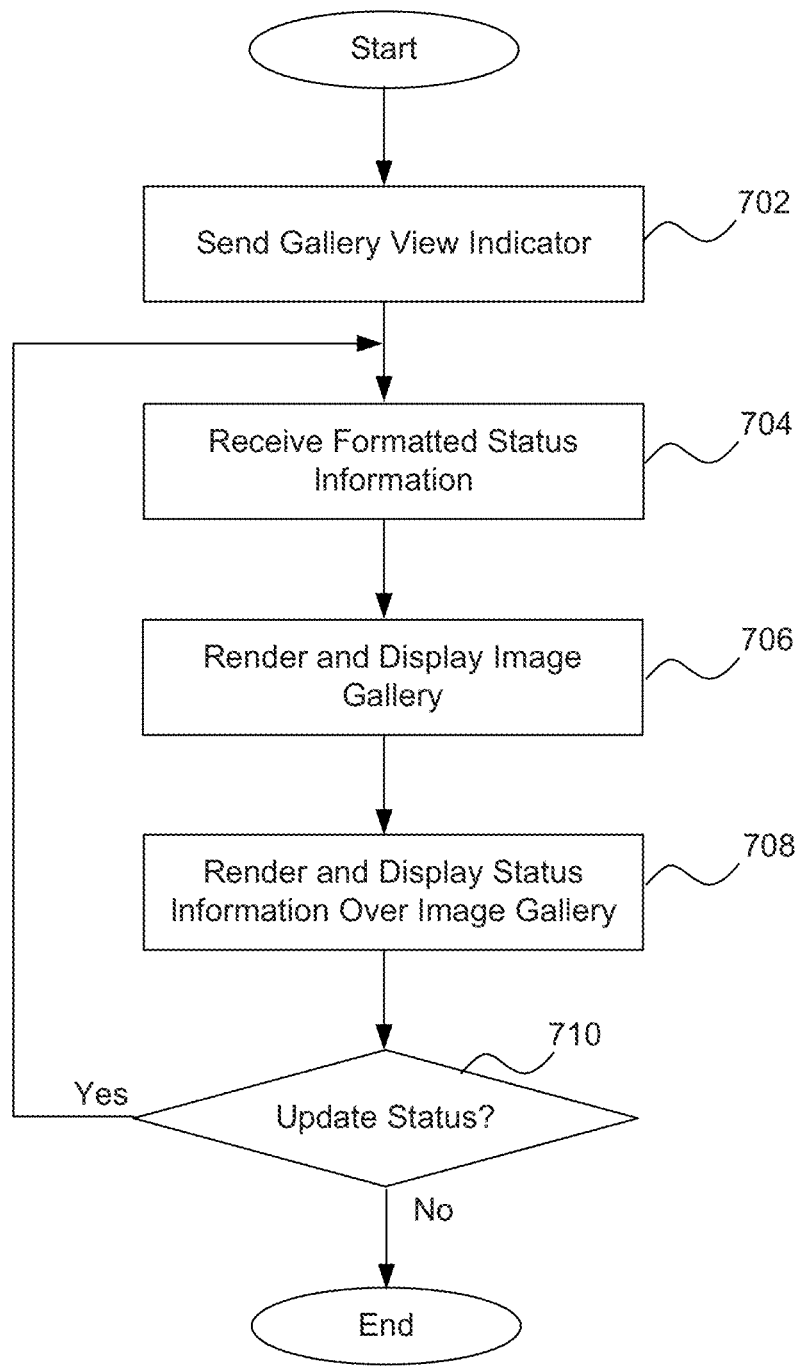
FIG. 7 is a flow diagram of an example method for processing data at a client device in accordance with various embodiments.

FIG. 7 is a flow diagram of an example method 700 for processing data at a client device, in accordance with various embodiments. The client device may comprise a mobile device (e.g., a cellular phone), a desktop device, or any other device that is communicatively coupled to the networked system 102. At operation 702, a galley view indicator is sent. In accordance with one embodiment, the user at the client device may select a button that indicates a desire to view items in a gallery view. The gallery view indicator is sent to one or more application servers associated with the networked system 102.

In response, formatted status information is received at operation 704. In example embodiments, the status information is formatted into gallery rendering and display instructions. The rendering and display instructions enables generation of status indicators from the status information for display over the image gallery at the client device. In some embodiments, the rendering and display instructions converts, or provides instructions to convert, the status information into status indicators (e.g., visually identifiable graphics) that represent the status information.

The rendering and display instructions may also include instructions for generating the image gallery on the client device at operation 706. The image galley may appear as a matrix of squares whereby each square is an image or thumbnail representing an item.

The status information is thus rendered into status indicators and displayed over the image gallery in operation 708. In one embodiment, the status indicator is rendered in a popover view over an image of an item associated with the status indicator. This embodiment may be utilized on displays that are generally larger (e.g., on a display device associated with a desktop computer). Thus, when a selection device (e.g., cursor of a mouse) is positioned over a particular image of the image gallery, then the status indicator(s) for the item depicted in the particular image are displayed in an expanded window over the particular image. In another embodiment, the status indicator is overlaid on an image of the image gallery including the item to which the status indicator pertains. This embodiment may be used on a smaller display device (e.g., associated with a cellular phone). It should be noted that operation 706 and 708 may be combined into a single operation and occur substantially concurrently.

At operation 710, a determination is made as to whether the status should be updated. A status update may occur for several reasons. In one embodiment, a status update request may be sent from the client device. In another embodiment, an event may trigger an update to the status (e.g., an item searched for and not initially found gets posted overnight). In a further embodiment, the status module 406 may update status at a predetermined time (e.g., every five hours). If a status update is needed, then the method returns to operation 704 whereby the status information is received and subsequently processed.

Figure 8A:
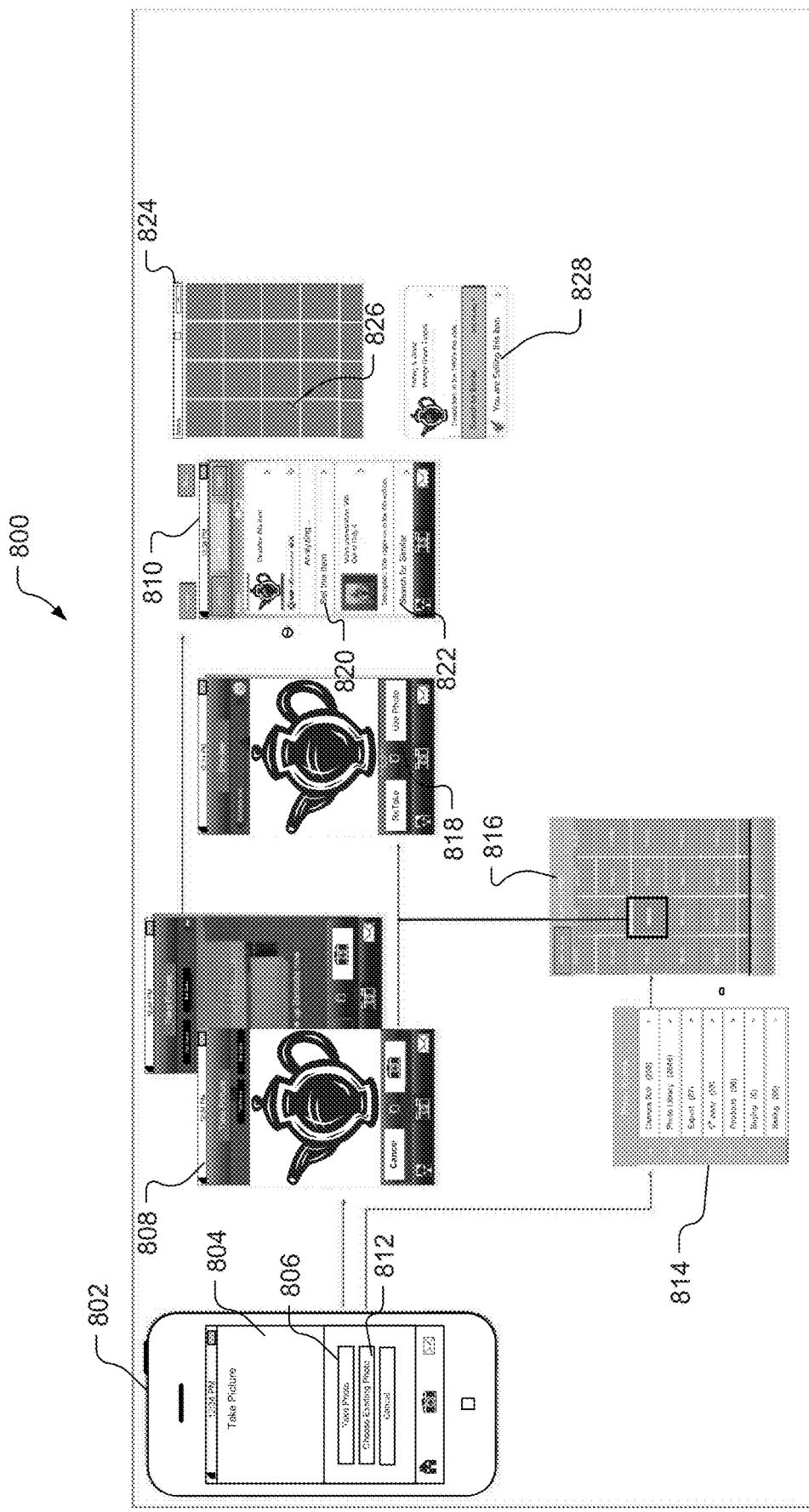
FIG. 8a is an example user interface illustrating a status indicator display method.
Figure 8B:
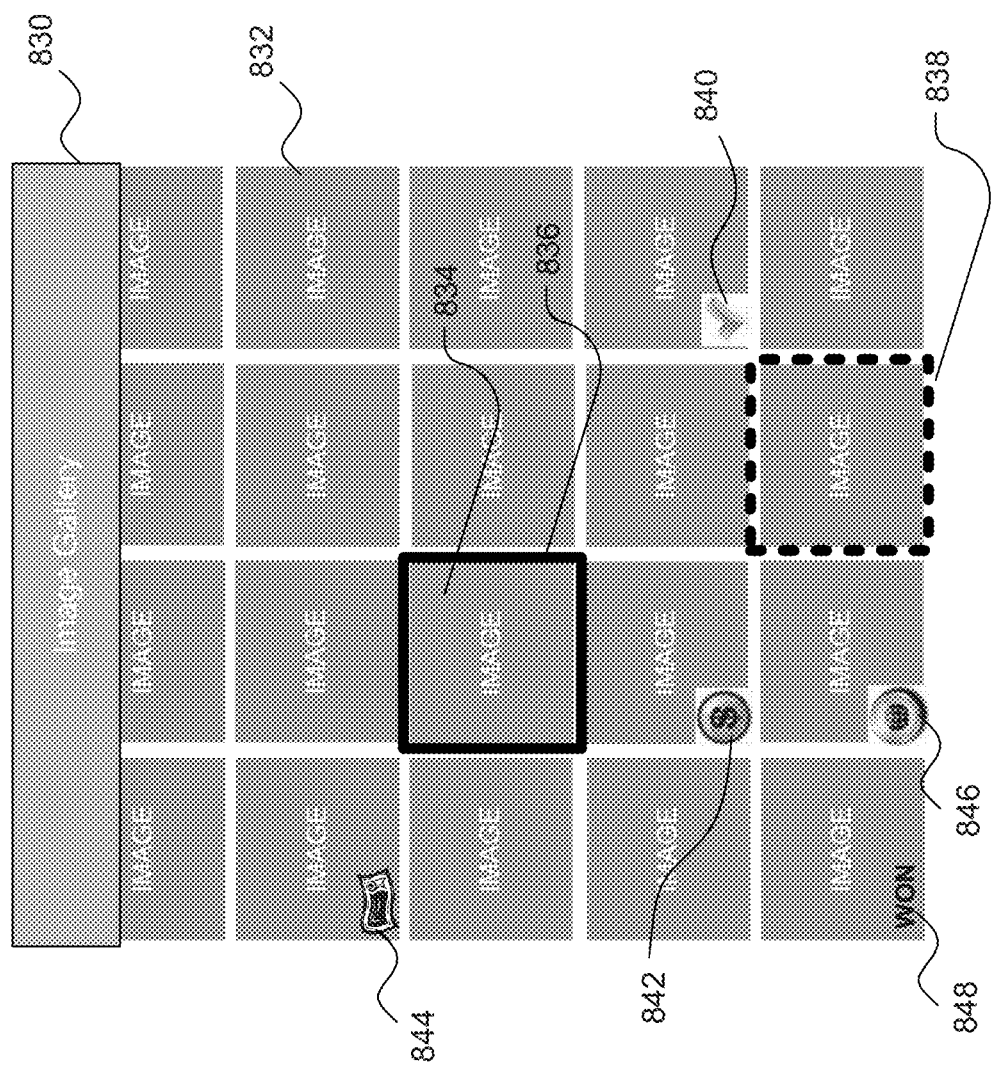
FIG. 8b is an example user interface illustrating an image gallery having status indicators.

FIG. 8*a*-FIG. 8*b* are example user interfaces illustrating the image galley and status indicator display method. FIG. 8*a* is a flow diagram illustrating a flow 800, according to an example embodiment, of user interfaces that may be presented to a user of a mobile device 802. The mobile device 802 comprises a display area interface 804. Using, for example, a "take photo" button 806 on the display area interface 804, a user may capture an image of an item or some other identifier (e.g., a bar code) associated with the item using a camera coupled to (e.g., integrated with) the mobile device 802. A selection of the "take photo" button 806 invokes a "take a picture" interface 808, which flows to a "my shots" interface 810.

Alternatively, using a "choose existing photo" button 812, a user may select an image already stored within a memory of the mobile device 802. User selection of the "choose existing photo" button 812 invokes a flow through a series of selection interfaces 814-818, which flow to the "my shots" interface 810. The button 812 allows selection of a category from a photo albums stored or associated with the mobile device 802. The interface 816 allows selection of a single image for further processing. The interface 818 allows preview of the captured image (e.g., picture the camera took) or the selected image.

The "my shots" interface 810 indicates that the selected image is being analyzed by the networked system 102 (e.g., has been uploaded from the mobile device 802, and is being subject to an image recognition process). The "my shots" interface 810 may also present the user with an option of either transacting an item represented in the image (e.g., "sell this item" 820) or of searching for an item similar to the item depicted in the selected image (e.g., "search for similar" 822).

In conjunction with the "sell this item" option, a user may be presented with an option of providing further description pertaining to the item to be sold. To this end, the user may be presented with a template that is pre-populated with attribute data retrieved, at least partially, from other listings that include images depicting similar items. The user may provide supplement data to the pre-populated template and send the template back to the networked system 102.

An image gallery 824 may be presented. The image gallery 824 now includes an image of the item the user is selling. A status indicator illustrated as a green check mark 826 is shown overlaid over the image of the item indicating that the mobile device 802 recognizes the image (e.g., because the mobile device 802 took the picture of the image and the image is located in the photo album). Alternatively or in addition, selection of the image from the image gallery may present an interface 828 providing more details of the item. It should be noted that a popover view of an item of the image gallery may, in accordance with one embodiment, have an appearance similar to the interface 828.

FIG. 8b is an illustration of an example image gallery 830. As shown, the image gallery 830 comprises a matrix of individual images 832. Each image 832 represents an item associated with user. The items may be associated as being on a list associated with the user's account, as a result of a search query, or by any other relationship with the user.

Various status indicators are displayed over the image gallery 830 to graphically illustrate various examples. One image 834 comprises a colored border 836. Another image comprises a different colored border 838. The colored borders 836 and 838, depending on the specific color, may indicate various statuses. For example, a blue border around the image may indicate that user sold the item; a red border around an image may indicate that the user did not win the auction for the item in the image; a yellow border around an image may indicate that the user is watching the item. While colors are discussed, alternative embodiments may use any feature that will distinguish from border from another border.

The image gallery 830 also illustrates several examples of visually identifiable graphics. For example, a green check mark 840 indicates an item that is recognized by the client device (e.g., in a photo album of the client device); a dollar sign 842 indicates an item the user is selling; a coupon graphic 844 indicates the item is on sale, discounted, or is the deal of the day; a globe 846 indicates an item that may be locally purchased. Text (e.g., "won" 848) may also be used as a status indicator. It should be noted that any color border or visually identifiable graphic may be used to indicate any status associated with the item in the image.

The status indicator associated with a particular image within the image gallery 830 may be dynamically updated, based on information received from the networked system 102. The status updates reflect a change in the status or an activity event with respect to the item in the image. For example, the dollar sign 842 may be dynamically updated or replaced with a different status indicator to indicate that the item depicted in the image has in fact been sold in the event that an auction for the listing concludes with a winning bidder. It will be appreciated that any number of status indicators may be overlaid on the images included within the image gallery to indicate a number of status states and events pertaining to the item and its associated listing that is hosted by the networked system 102.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine Readable Medium

Figure 9:
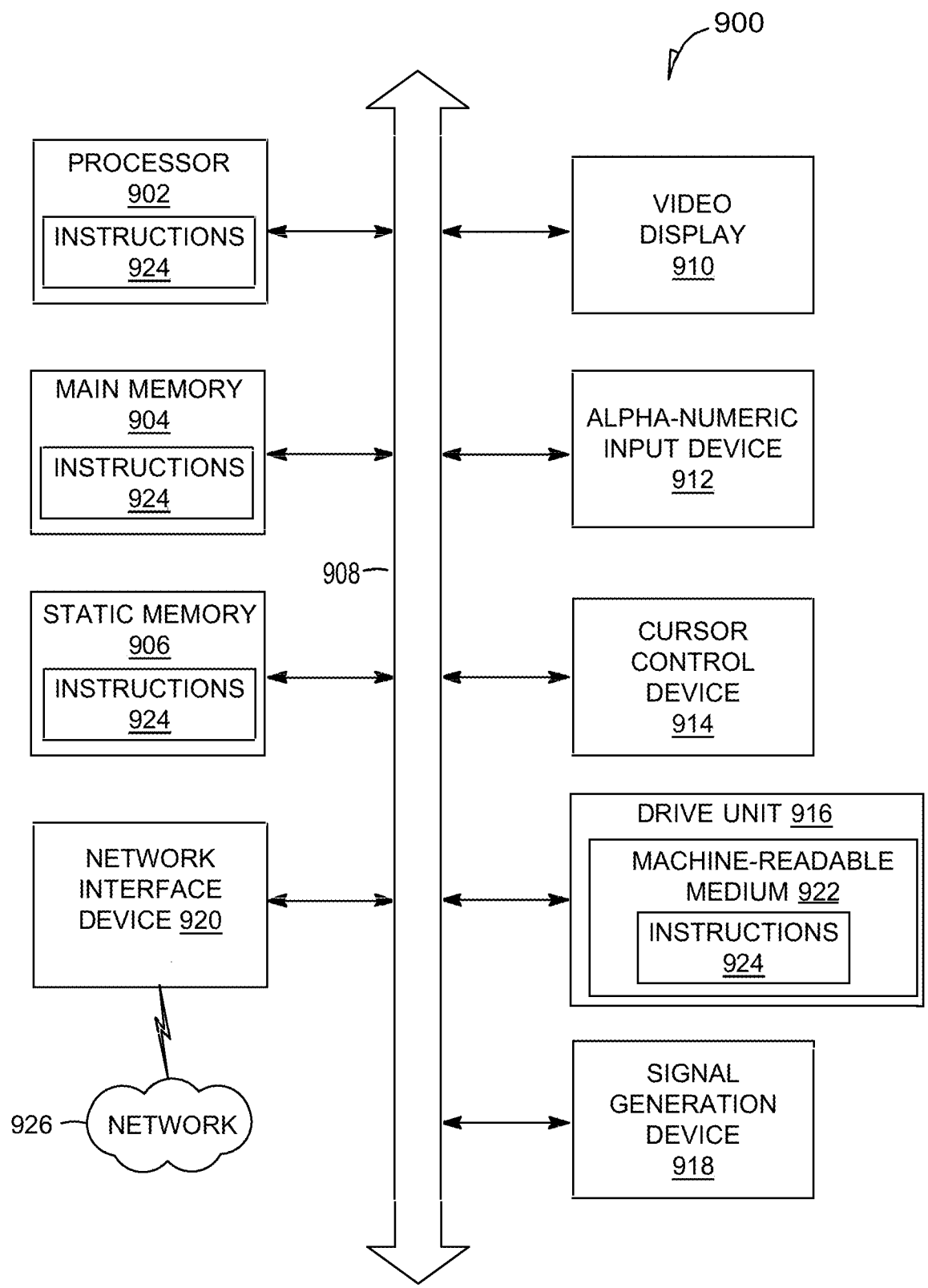
FIG. 9 is a simplified block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of various embodiments has been described with reference to specific examples, various modifications and changes may be made to these embodiments without departing from the broader spirit and scope of embodiments. The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments as represented by the appended claims. The specification and drawings are, accordingly, to be regarded in an illustrative rather than a restrictive sense.

What is claimed is:

1. A method comprising:
displaying, at a client device, a content gallery associated with an account of a user of a network-based publication system, the content gallery comprising a plurality of content items from a database of the network-based publication system and associated with the account of the user of the network-based publication system, the content gallery being an image gallery that includes content item images as a matrix of rectangles, each of the rectangles representing a content item available in the network-based publication system, and the network-based publication system monitoring content items of interest to the account;
receiving, from the network-based publication system, an indication that a trigger event occurring in the network-based publication system is detected, the trigger event associated with the content items of interest to the account, and the trigger event further corresponding to a content item not included in the content gallery being added to the content gallery at the client device and to a database of currently available content items offered on the network-based publication system; and responsive to receiving the indication that the trigger event is detected from the network-based publication system, displaying, at the client device and in the content gallery, status information in relation to the plurality of content items to indicate the content item not included in the content gallery has been added, wherein the status information is rendered over at least one content item of the plurality of content items including the added content item.

2. The method as described in claim 1, wherein displaying the content gallery is responsive to a search and the content gallery comprises results of the search.

3. The method as described in claim 1, further comprising determining content items to include in the content gallery based on information associated with the account of the user.

4. The method as described in claim 1, further comprising determining content items to include in the content gallery based on one or more lists associated with the account of the user.

5. The method as described in claim 1, further comprising:
receiving a selection of a content item of the content gallery; and
providing one or more details of the content item of the content gallery.

6. The method as described in claim 1, further comprising:
receiving updated status information from the network-based publication system; and
displaying, at the client device and in the content gallery, the updated status information in relation to the plurality of content items including the added content item, the updated status information being rendered over at least one content item of the plurality of content items including the added content item.

7. The method as described in claim 1, further comprising:
receiving a selection of a content item of the plurality of content items of the content gallery; and
providing a popover view of the content item of the plurality of content items of the content gallery.

8. A client device comprising:
a display device; and
an application implemented at the client device to:
display, via the display device, a content gallery associated with an account of a user of a network-based publication system, the content gallery comprising a plurality of content items from a database of the network-based publication system and associated with the account of the user of the network-based publication system, the content gallery being an image gallery that includes content item images as a matrix of rectangles, each of the rectangles representing a content item available in the network-based publication system, and the network-based publication system monitoring content items of interest to the account;
receive, from the network-based publication system, an indication that a trigger event occurring in the network-based publication system is detected, the trigger event associated with the content items of interest to the account, and the trigger event further corresponding to a content item not included in the content gallery being added to the content gallery at the client device and to a database of currently available content items offered on the network-based publication system; and
responsive to receipt of the indication that the trigger event is detected from the network-based publication system, display, via the display device and in the content gallery, status information in relation to the plurality of content items to indicate the content item not included in the content gallery has been added, wherein the status information is rendered over at least one content item of the plurality of content items including the added content item.

9. The client device as described in claim 8, wherein the display of the content gallery is responsive to a search and the content gallery comprises results of the search.

10. The client device as described in claim 8, wherein the application is further implemented to receive information associated with the account of the user, and content items to include in the content gallery are determined based on the information associated with the account of the user.

11. The client device as described in claim 8, wherein the application is further implemented to receive input used to form one or more lists associated with the account of the user, and content items to include in the content gallery are determined based on the one or more lists.

12. The client device as described in claim 8, wherein the application is further implemented to:
receive a selection of a content item of the content gallery; and
provide one or more details of the content item of the content gallery.

13. The client device as described in claim 8, wherein the application is further implemented to:
receive, from the network-based publication system, updated status information; and
display, at the client device and in the content gallery, the updated status information in relation to the plurality of content items including the added content item, the updated status information being rendered over at least one content item of the plurality of content items including the added content item.

14. The client device as described in claim 8, wherein the application is further implemented to:
receive a selection of a content item of the plurality of content items of the content gallery; and
display, via the display device, a popover view of the content item of the plurality of content items of the content gallery.

15. One or more non-transitory computer-readable storage media having stored thereon instructions that are executable by at least one processor to perform operations comprising:
displaying, at a client device, a content gallery associated with an account of a user of a network-based publication system, the content gallery comprising a plurality of content items from a database of the network-based publication system and associated with the account of the user of the network-based publication system, the content gallery being an image gallery that includes content item images as a matrix of rectangles, each of the rectangles representing a content item available in the network-based publication system, and the network-based publication system monitoring content items of interest to the account;
receiving, from the network-based publication system, an indication that a trigger event occurring in the network-based publication system is detected, the trigger event associated with the content items of interest to the account, and the trigger event further corresponding to a content item not included in the content gallery being added to the content gallery at the client device and to a database of currently available content items offered on the network-based publication system; and responsive to receiving the indication that the trigger event is detected from the network-based publication system, displaying, at the client device and in the content gallery, status information in relation to the plurality of content items to indicate the content item not included in the content gallery has been added, wherein the status information is rendered over at least one content item of the plurality of content items including the added content item.

16. The one or more non-transitory computer-readable storage media as described in claim 15, wherein displaying the content gallery is responsive to a search and the content gallery comprises results of the search.

17. The one or more non-transitory computer-readable storage media as described in claim 15, wherein the operations further comprise determining content items to include in the content gallery based on information associated with the account of the user.

18. The one or more non-transitory computer-readable storage media as described in claim 15, wherein the operations further comprise:

receiving, from the network-based publication system, updated status information; and displaying, at the client device and in the content gallery, the updated status information in relation to the plurality of content items including the added content item, the updated status information being rendered over at least one content item of the plurality of content items including the added content item.

19. The one or more non-transitory computer-readable storage media as described in claim 15, wherein the operations further comprise:

receiving a selection of a content item of the plurality of content items of the content gallery; and providing one or more details of the content item of the plurality of content items of the content gallery.

20. The one or more non-transitory computer-readable storage media as described in claim 15, wherein the operations further comprise:

receiving a selection of a content item of the plurality of content items of the content gallery; and displaying, via the display device, a popover view of the content item of the plurality of content items of the content gallery.

* * * * *